United States Patent [19]

Kawamura

[11] Patent Number: 5,176,439
[45] Date of Patent: Jan. 5, 1993

[54] ILLUMINATED SEAT BELT BUCKLE
[75] Inventor: Yoshihisa Kawamura, Shiga, Japan
[73] Assignee: Takata Corporation, Tokyo, Japan
[21] Appl. No.: 693,811
[22] Filed: Apr. 30, 1991
[30] Foreign Application Priority Data
  May 11, 1990 [JP] Japan .................. 2-122570
[51] Int. Cl.⁵ .............................. B60Q 3/00
[52] U.S. Cl. .................... 362/108; 362/32;
                                362/75; 362/83.3
[58] Field of Search ............. 362/108, 32, 61, 83.3,
        362/103, 80, 362, 31, 75, 800, 26, 27, 330;
                                385/901; 359/599

[56] References Cited
U.S. PATENT DOCUMENTS
3,216,394 11/1965 Blackwell ............... 385/901
3,352,277 11/1967 Schmidt ................ 362/32
4,181,832 1/1980 Ueda .................. 362/80
4,237,586 12/1980 Morinaga .............. 362/103
4,933,818 6/1990 Eckmann ............... 362/61

Primary Examiner—Ira S. Lazarus
Assistant Examiner—L. Heyman
Attorney, Agent, or Firm—Brumbaugh, Graves, Donohue & Raymond

[57] ABSTRACT

An illuminated seat belt buckle comprises a light source disposed within the buckle for emitting light and a member of light transmission material in the buckle forming a path for conducting light from the light source to a selected portion of the buckle. The member includes a first portion to receive light from the source, a second portion forming an angle with the first portion such the direction of the path changes, and a totally internally reflecting prism for reflecting the light from the first portion to the second portion.

3 Claims, 4 Drawing Sheets

ILLUMINATED SEAT BELT BUCKLE

BACKGROUND OF THE INVENTION

This invention relates to an illuminated seat belt buckle.

Ordinarily, a seat belt with which a vehicle, such as an automotive vehicle, is equipped is fastened in place to restrain the body of a passenger by inserting a tongue, through which the belt passes, into a buckle. A problem encountered is that it is not easy to find the receptacle portion of the buckle into which the tongue is to be inserted in an unlighted vehicle at night. For this reason, various proposals have been made in which an illuminating device is incorporated within the buckle to illuminate the tongue receptacle so that it can be seen in the dark.

For example, the arrangements disclosed in Japanese Patent Application Laid-Open (KOPKAI) No. 48-49126 and Japanese Patent Publication (KOKOKU) No. 55-30367, as well as the arrangements disclosed in Japanese Utility Model Application Laid-Open (KOKAI) No. 61-3155, Japanese Utility Model Application Laid-Open (KOKAI) No. 61-36469 and Japanese Utility Model Publication No. 63-42809, all have a configuration in which light source is incorporated in the mechanism of the buckle or in the illuminated portion itself.

In the disclosure of Japanese Patent Publication (KOKOKU) No. 55-30366, an arrangement is proposed in which an optical fiber is passed between a support plate and cover of the buckle mechanism, and the tip of the optical fiber is directed toward the tongue receptacle opening. In the buckle of Japanese Utility Model Publication (KOKOKU) No. 63-42807, a light source is provided on the rear portion of a cover, and the space within the buckle mechanism is used as an optical path to illuminate the edge of the tongue receptacle opening and a release button. Further, in the disclosure of Japanese Utility Model Publication (KOKOKU) No. 57-22803, an arrangement is disclosed in which a light-emitting diode serving as a light source is attached to the leading end of a case half to directly illuminate a member at the tongue receptacle opening.

In these examples of the prior art, in which the light source is incorporated in the buckle mechanism or the illuminated portion itself, a lamp, an LED or the like serving as the light source is arranged as close as possible to the illuminated portion in order to provide a sufficient amount of light with little power consumption. However, incorporating the light source in the buckle mechanism places a limitation upon the design of the lighting device and often makes it necessary to modify the buckle mechanism. It is difficult to provide a light source in a buckle having a conventional mechanism.

In known arrangements wherein the illuminating device is incorporated in the buckle mechanism in the space between cover and the mechanism, any influence upon the design of the buckle mechanism can be avoided, but the optical path is not as favorable and hence a sufficient amount of light cannot be introduced to the illuminated portion to illuminate it with uniform brightness.

SUMMARY OF THE INVENTION

The present invention has been devised in view of the foregoing circumstances, and its object is to provide an illuminating device which can be applied to a variety of seat belt buckles, irrespective of the form of the buckle mechanism, this object being achieved by an illuminating device capable of illuminating an illuminated portion uniformly with a sufficient amount of light without having any undesirable effect upon the construction of the buckle mechanism.

According to the present invention, the foregoing object is attained by an illuminated seat belt buckle having a light source in the buckle for emitting light. The invention is characterized in that a member of a light-transmissive material is provided in the buckle to form a path for conducting light from the light source to a selected portion of the buckle, in that the member includes a first portion located to receive light from the source and a second portion forming an angle with the first portion such the direction of the path changes, and in that the member includes a totally internally reflecting prism for reflecting the light from the first portion to the second portion.

If desired, the second portion of the member may have a second totally internally reflecting prism for reflecting light conducted to it along the second portion in a direction out of the member. The second totally internally reflecting prism may have fine irregularities such that the light reflected by it is diffused.

With the buckle illuminating device of the invention described above, the prism reflects the light from the light source along a divergent optical path inside the buckle, thereby changing the direction of the light without loss and directing the light to the illuminated portion in a highly advantageous way.

DESCRIPTION OF THE DRAWINGS

FIGS. 2A, 2B and 2C schematically illustrate an optical path formed within the buckle, in which FIG. 2A is a plan view, FIG. 2B a front view and FIG. 2C a side sectional view;

DESCRIPTION OF THE PREFERRED EMBODIMENTS

Embodiments of the present invention will now be described with reference to the drawings.

Figure 1:
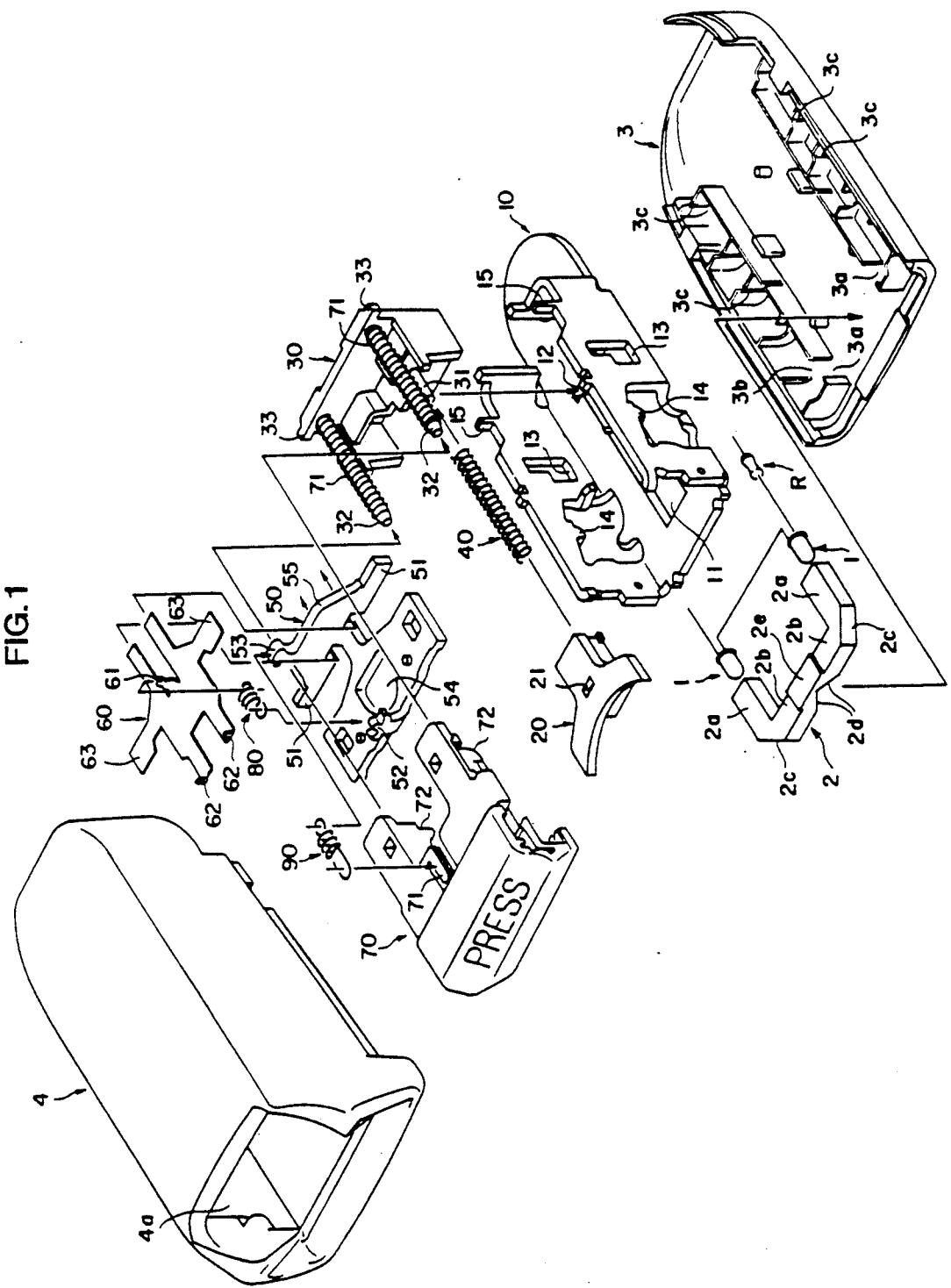
FIG. 1 is an exploded perspective view showing a first embodiment of a buckle, to which the arrangement of the present invention is applied.

Referring to FIG. 1, the buckle has a mechanism composed of components 10 through 90 similar to the usual components found in the prior art. The mechanism is accommodated within a cover comprising an upper cover part 4 and a lower cover part 3.

The mechanism includes a channel-shaped base 10; an ejector 20, which is fitted into a longitudinal slot 11 formed in the bottom of the base 10 for sliding longitudinally along the base 10; a spring holder 30, which is attached with a lower projection fitted into a transverse slot 12 connected with the rear end of the longitudinal slot 11 (for convenience, the stalk end of the buckle will be referred to as the rear, the push-button end as the front, the upper-cover side as the upper side, and the lower-cover side as the lower side) and with left and right rear projections 33 in abutting contact with rear wall projections 15 of the base 10; an ejector spring 40 fitted onto a shaft 31 projecting forwardly from the spring holder 30 and having one end supported on the front side of the spring holder 30 and the other end in abutting contact with and supported on the bottom of a rearwardly facing hole in the ejector 20; a latch plate 50 freely rockably attached to the base 10 with pivot support arms 51 engaged in openings 13 in the side walls of the base 10, the latch plate 50 being prevented from falling out by the front edge of the spring holder 30; a locking plate 60 supported on the latch plate 50 and overlapping the same; a push-button 70 covering the latch plate 50 and the locking plate 60; a tension spring 80 connected under tension between a front projection 52 of the latch plate 50 and a rear projection 52 of the latch plate 50 and a rear projection 61 of the locking plate 60; a tension spring 90 connected under tension between a spring-supporting projection 71 on the upper surface of the push-button 70 and a rear projection 53 on the latch plate 50; and a compression restoration spring 71 fitted onto a shaft 32 projecting forwardly from the spring holder 30 and having one end in abutting contact with the front surface of the spring holder 30 and the other end in abutting contact with the bottom of a rearwardly open hole in the push-button 70.

The cover comprises the upper cover 4 and the lower cover 3, as mentioned earlier. The upper cover 4 is of a box-shaped configuration, the bottom portion of which is open, and has a front wall having an opening 4a which exposes the front surface of the push-button 70 and a rear wall having an opening into which the buckle stalk is inserted. In FIG. 1, the buckle stalk and the mechanism connected thereto are not shown.

In this embodiment, the arrangement of the invention is such that the space on the inner side of the lower cover 3 is made to serve as an optical path within the buckle. More specifically, the present invention employs as light sources light-emitting diodes (hereinafter referred to as "LED") 1. An optical path for introducing the light from the LEDs 1 to an illuminated portion comprising the ejector 20 within the buckle is provided by a light guide 2 having totally internally reflecting prisms for changing the direction of the light.

The light guide 2 is made of a light-transmissive material, such as a clear polymeric material, and has an overall C-shaped configuration. The light guide 2 includes longitudinal light-guiding portions 2a (one for each LED) extending longitudinally of the buckle and a transverse light-guiding portion extending across the buckle. At the juncture of each longitudinal light-guiding portion 2a with the transverse light-guiding portion 2b is a 45 degree inclined surface that forms a first reflecting prism portion 2c. Further, the lower side of the central portion of the horizontal light-guiding portion 2b is provided with a shallow V-shaped notch to form second reflecting prism portions 2d.

In this example, the two LEDs 1 serving as the light sources are connected in series with a resistor R and are further connected to a battery power supply of an automotive vehicle or the like. The LEDs 1 are arranged in close proximity to the end faces of the respective longitudinal light-guiding portions 2a of the light guide 2. The lead wires of the LEDs 1 are led out to the rear opening through slits 3c formed in transverse ribs of the lower cover 3.

The ejector 20, which serves as the illuminated portion in this example, consists of a light-transmissive material, such as a clear polymeric material, and is provided with a V-shaped recess 21 in its upper face. The recess 21 functions in the same manner as the prism portions of the light guide 2 and serves to reflect, at right angles, the light introduced from below by the light guide 2, thereby guiding the light to the front. Accordingly, the arrangement is such that a light-radiating or emitting surface 2e of the light guide 2 opposes the recess 21 of ejector 20 when the ejector is in the position at the front of the buckle it attains when the tongue is not inserted.

Figure 2A:
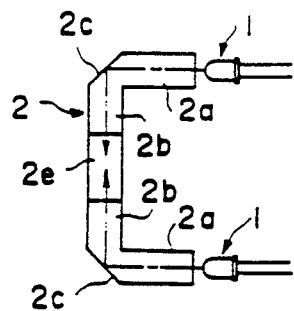
Figure 2B:
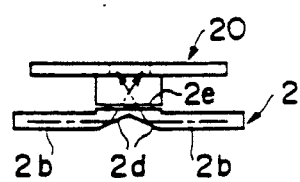
Figure 2C:
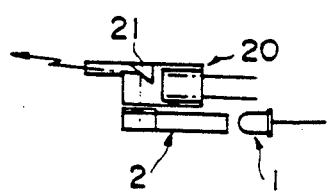

FIGS. 2A, 2B and 2C schematically show only the illuminating device of the buckle and illustrates the optical path. As shown in the plan view of FIG. 2A, light emitted by the LEDs 1 enters the light guide 2 from the end faces of the longitudinal light-guiding portions 2a and reaches the first prism portions 2c, where the light is reflected and caused to propagate along the transverse light guiding portions 2b. Next, as shown in the front view of FIG. 2B, the light is reflected at the second prism portions 2d and is emitted from the light-radiating surface 2e. As illustrated in the side sectional view of FIG. 2c, the light which has emerged from the light-radiating surface 2e enters from the lower surface of the ejector 20 and is reflected at the recess 21 of the ejector 20 so as to propagate forwardly and emerge from the front surface of the ejector. Though not illustrated, fine irregularities are provided on the second prism portions 2d so that the light when reflected by the second prism portions 2d undergoes a suitable amount of diffusion. Thus, the front surface of the ejector 20 illuminated by the light exiting from the light-radiating surface 2e is illuminated at uniform brightness, thereby making it easy to see the region of the illuminated portion.

Figure 3A:
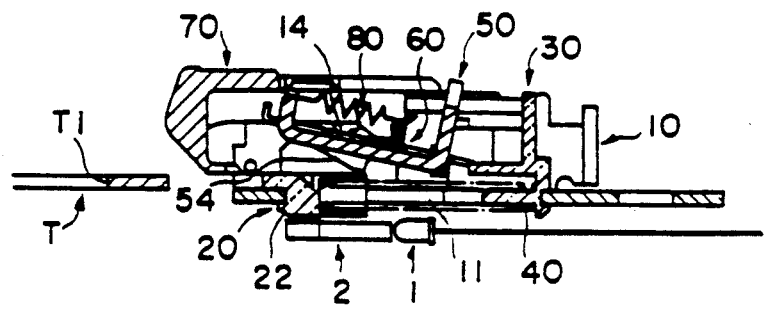
FIG. 3 is a side sectional view illustrating the operation of the invention.
Figure 3B:
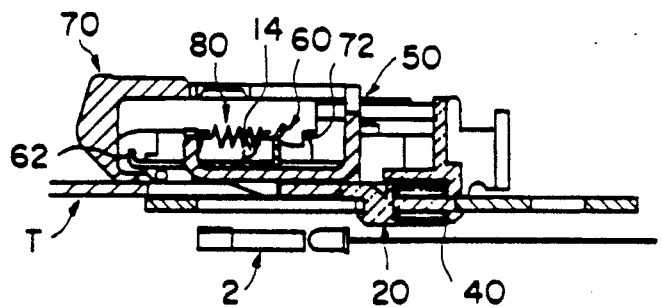

FIGS. 3A and 3B are sectional views illustrating the operation of the buckle constructed as set forth above (the covers 3, 4 and tension spring 90 are not included in the drawing). In FIG. 3A, which illustrates a tongue T prior to insertion, the ejector 20 is at a forwardmost position in which the front surface of a sliding piece 22 thereof is in abutting contact with the front end of the longitudinal slot 11. Under these conditions, the latch plate 50 is in an upwardly urged state since a projection 54 (which, along with components associated therewith, is shown also in FIG. 1) on the lower surface of the latch plate engages an opening T1 in tongue T and is in abutting contact with the upper surface of the ejector 20. With the locking plate 60 at a position to which it is retracted by the force of the spring 80, the front edges of arms 63 of the locking plate are in abutting contact with rear cam faces of projections 14 extending downwardly from the edges of openings formed in side walls of the base 10. Under these conditions, the exposed surface of the ejector 20 is illuminated by light from the rear side thereof and therefore can be seen from outside the buckle even in the dark.

Next, when the tongue T is inserted, the ejector 20 is engaged by the front edge of the tongue T and is pushed back against the force of the spring 40 so that the front edge of the ejector 20 separates from the projection 54 on the lower surface of the latch plate 50. When the tongue T attains a position at which the edge of the latch opening T1 passes the projection 54, the downwardly acting restraint of the latch plate 50, which until now has been blocking the advance of the locking plate 60, is released. Consequently, the force produced by tension spring 80 causing the locking plate 60 to advance predominates so that the front edges of the arms 63 of the locking plate 60 ride up on the rear cam surfaces of the projections 14. As this takes place, the front side of the latch plate 50 is urged downwardly and rocks in the counter-clockwise direction so that the projection 54 on the lower surface of latch plate 50 enters the latch opening T1 of tongue T and engages the edge of this opening to hold the tongue T is thus inserted, the ejector 20 is pushed deeply into the base 10 so that the ejector opening is blocked by the tongue T. This assures that light from the LEDs will not leak to the exterior of the buckle.

FIG. 3B illustrates the tongue T in such a locked state. If the push-button 70 is now pressed in order to release the tongue T, the rear surface of the push-button 70 abuts against the front edge 62 of locking plate 60 and presses it to the rear, as a result of which the locking plate 60 is retracted against the force of the tension spring 80 and attains a position at which the front edges of the arms 63 separate from the projections 14. When this occurs, projections 72 of the push-button 70 strike a vertical wall 55 at the rear end of the latch plate 50, whereby the plate 50 is pushed. As a consequence, the latch plate 50 is rocked clockwise about the pivot support arm 51 so that the opening T1 of tongue T and projection 54 are disengaged, the ejector 20 is urged and advanced by the push-up spring 40, and the tongue T is expelled from the buckle T. As a result of this operation, the front surface of the ejector 20 is again exposed to the outside of the buckle to bring the ejector 20 and the optical path the light guide 2 into line. This restores the ejector 20 to the visible state while directly illuminating the insertion position of the tongue T. This is the state illustrated in FIG. 3A.

Thus, in accordance with the arrangement of this first embodiment, an optical path is formed in the lower cover 3, as illustrated in FIGS. 1, 2A, 2B and 2C. This makes it possible to provide an illuminating device without a major modification in the conventional construction of the buckle. In addition, since the ejector 20 per se, which is the portion at which the tongue is inserted, emits a sufficient amount of light, this greatly facilitates the tongue insertion operation. Moreover, since the illuminated or non-illuminated state of the ejector 20 when viewed from outside the buckle is realized automatically by insertion or withdrawal of the tongue, a switch need not be installed.

Figure 6:
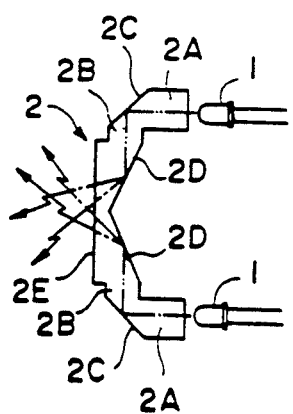
FIG. 6 is a plan view illustrating the optical path within the buckle of the second embodiment.
Figure 5:
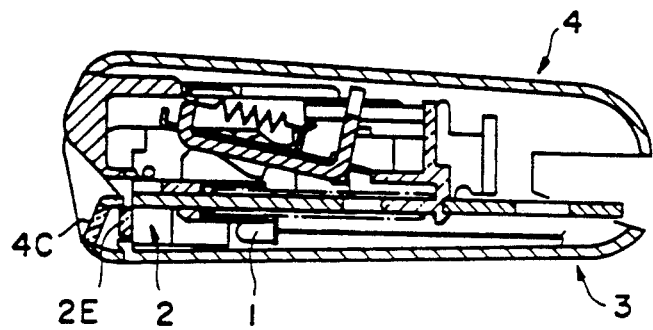
FIG. 5 is a side sectional view of the second embodiment.
Figure 4:
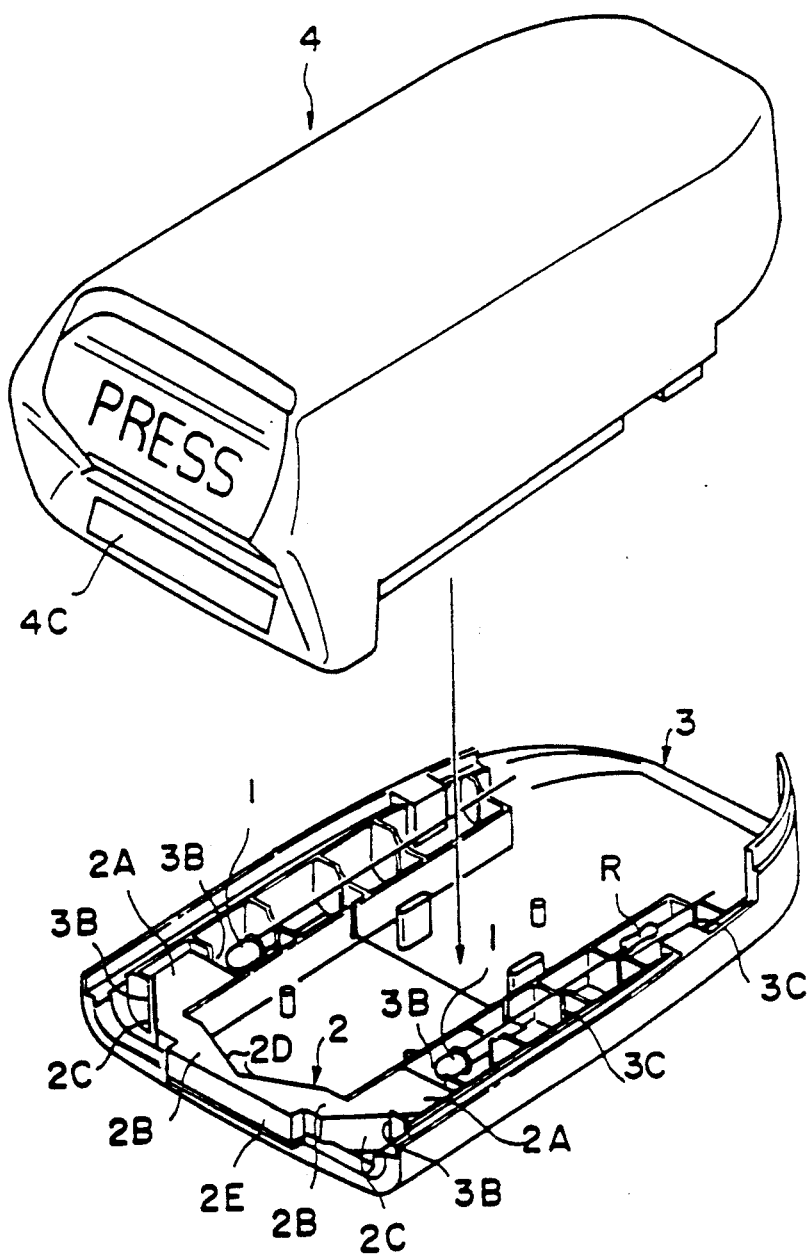
FIG. 4 is an exploded perspective view showing a second embodiment of a buckle to which the arrangement of the present invention is applied.

A second embodiment of the present invention is illustrated in FIGS. 4 through 6. This embodiment differs from that described above in that an arrangement which illuminates a portion of the cover is adopted.

As shown in the exploded perspective view of FIG. 4, a transparent illumination window 4C is provided in the lower part of the front surface of upper cover part 4, and an illuminating device is incorporated in the lower cover part 3. As in the foregoing embodiment, the illuminating device is constituted by the LEDs 1 and the light guide 2, but the shape of light guide 2, which consists of a light-transmissive material such as a clear polymeric material, has an overall C-shaped configuration and includes longitudinal light-guiding portions 2A extending longitudinally of the buckle, and a transverse light-guiding portion extending across the buckle. At the functions of the longitudinal light guiding portions 2a with the transverse light-guiding portion 2B are 45 degree inclined surfaces that form first reflecting prism portions 2C. In this embodiment, the rear side of the central portion of the horizontal light guiding portion 2B is provided with a shallow V-shaped notch to form second reflecting prism portions 2D.

The portion of the lower cover 3 accommodating the light guide 2 and the LEDs 1 is formed by cutting away portions of the reinforcing ribs. Among the transverse ribs, only those portions of ribs 3B on the front side that receive the light guide 2 and LEDs 1 are cut away.

In this embodiment also, the two LEDs 1 serving as the light sources are connected in series with a resistor R and are arranged in close proximity to the end faces of the respective longitudinal light-guiding portions 2A of the light guide 2. The lead wires of the LEDs 1 are led out to the rear opening through slits 3C formed in transverse ribs of the lower cover 3, and they are connected to a battery power supply through a switch, if desired, incorporated within the mechanism or provided externally. In FIG. 4, the LEDs 1 and the lead wires thereof are shown displaced above their actual mounting positions.

FIG. 5 is a sectional view illustrating the buckle in the assembled state. Here the assembly is such that the light-radiating surface 2E of the light guide 2 is situated opposite and in close proximity to the transparent window 4C of the upper cover 4.

FIG. 6 is a plan view schematically representing only the illuminating device of the buckle and illustrating the optical path thereof. Light emitted by the LEDs 1 enters the light guide 2 from the end faces of the longitudinal light-guiding portions 2A and reaches the first prism portions 2C, where the light is reflected and caused to propagate along the transverse light-guiding portion 2B. Next, the light is reflected at the second prism portions 2D and is emitted from the light-radiating surface 2E. The light that has emerged from the light-radiating surface 2E reaches the transparent window C illustrated in FIGS. 4 and 5, thereby illuminating the window 4C. In this embodiment also, fine irregularities are provided on the second prism portions 2D so that the light when reflected by the second prism portions 2D undergoes a suitable amount of diffusion. Thus, the entire surface of the illuminating window 4C illuminated by the light exiting from the light-radiating surface 2E is illuminated at uniform brightness, thereby making it easy to see the region of the illuminated portion.

Thus, in accordance with the arrangement of the second embodiment, the optical path is formed entirely within the lower cover 3. This makes it possible to realize an illuminating device without a major modification in the conventional construction of the buckle.

Thus, in accordance with the present invention, the optical path of light from one or more light sources can be changed greatly within the very small space available within the buckle by utilizing the principle of a totally internally reflecting prism. As a result, a buckle having a mechanism in wide use can be converted into an illuminated buckle without requiring appreciable modification.

Though the present invention has been described in detail based upon two embodiments, the invention is not limited to these embodiments but can be modified in various ways within the scope of the claims.

In particular, the light guide used in the present invention can have various configurations as necessary. In addition, the optical path can be constructed in combination with other light guiding means, such as optical fibers or lenses. An arrangement can be adopted in which the light source is provided externally and the light emitted thereby is introduced to the light guide by light-guiding elements such as an optical fiber. Furthermore, the illuminating device of the present invention need not necessarily be provided inside the cover and there is no impediment to incorporating it in the mechanism of the buckle.

Thus, in accordance with the present invention, as described in detail above, an optical path having several changes in direction can be formed in the small space available in a buckle. As a result, incorporating the illuminating device does not make necessary a major modification in the construction of the buckle mechanism. This makes it possible to provide an illuminated buckle that can easily be applied to the conventional buckle.

I claim:

1. An illuminated seat belt buckle comprising a light source disposed within the buckle for emitting light, a member of light-transmissive material disposed within the buckle and defining a path for conducting the light emitted from the light source to a single selected light-radiating portion thereof, and a buckle tongue ejector movable to a retracted position in the buckle when a buckle tongue is inserted into the buckle and movable to an extended position in the buckle when a buckle tongue is removed from the buckle, the ejector being of a light-transmissive material, the light-transmissive member including a first portion located to receive light from the light source, a second portion forming an angle with the first portion, a totally internally reflecting prism located at the juncture of the respective first and second portions of the member for reflecting light from the first portion to the second portion, and a second totally internally reflecting prism located to receive light reflected by the first prism and reflect it to the light-radiating portion, and the light-radiating portion of the member being located to direct light onto the ejector when it is in the extended position, whereby the ejector emits light to the outside of the buckle to facilitate insertion of the buckle tongue when the buckle is not inserted and does not emit light when the buckle tongue is inserted into the buckle.

2. An illuminated seat belt buckle comprising a pair of light sources disposed within the buckle in spaced-apart relation for emitting light, a member of light-transmissive material disposed within the buckle and defining paths for conducting the light emitted from the light sources to a single selected light-radiating portion thereof, and a buckle tongue ejector movable to a retracted position in the buckle when a buckle is inserted into the buckle and movable to an extended position in the buckle when a buckle tongue is removed from the buckle, the ejector being of a light-transmissive material, the light-transmissive member including a pair of first portions located in spaced-apart relation to receive light from the respective light sources, a pair of second portions, each forming an angle with a respective first portion, a pair of first totally internally reflecting prisms, each first prism being located at the juncture of the respective first and second portions of the member for reflecting light from the first portion to the second portion, and a pair of second totally internally reflecting prisms, each located to received light reflected by a respective first prism and reflect it to the light-radiating portion, whereby the light from the pair of light sources is combined at the light-radiating portion, and the light-radiating portion of the member being located to direct light onto the ejector when it is in the extended position, whereby the ejector emits light to the outside of the buckle to facilitate insertion of the buckle tongue when the buckle is not inserted and does not emit light when the buckle tongue is inserted into the buckle.

3. An illuminated seat belt buckle comprising a light source disposed within the buckle for emitting light, a member of light-transmissive material disposed within the buckle and defining a path for conducting the light emitted from the light source to a single selected light-radiating portion thereof, and a buckle tongue ejector movable to a retracted position in the buckle when a buckle tongue is inserted into the buckle and movable to an extended position in the buckle when a buckle tongue is removed from the buckle, the ejector being of a light-transmissive material, and the light-radiating portion of the member being located to direct light onto the ejector when it is in the extended position, whereby the ejector emits light to the outside of the buckle to facilitate insertion of the buckle tongue when the buckle is not inserted and does not emit light when the buckle tongue is inserted into the buckle.

* * * * *